(12) United States Patent
Li et al.

(10) Patent No.: US 10,650,102 B2
(45) Date of Patent: May 12, 2020

(54) METHOD AND APPARATUS FOR GENERATING PARALLEL TEXT IN SAME LANGUAGE

(71) Applicant: BEIJING BAIDU NETCOM SCIENCE AND TECHNOLOGY CO., LTD., Beijing (CN)

(72) Inventors: Pengkai Li, Beijing (CN); Jingzhou He, Beijing (CN); Zhihong Fu, Beijing (CN); Xianwei Xin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/900,166

(22) Filed: Feb. 20, 2018

(65) Prior Publication Data

US 2018/0365231 A1 Dec. 20, 2018

(30) Foreign Application Priority Data

Jun. 19, 2017 (CN) .......................... 2017 1 0464118

(51) Int. Cl.
*G06F 17/27* (2006.01)
*G06F 17/28* (2006.01)
(Continued)

(52) U.S. Cl.
CPC .......... *G06F 17/28* (2013.01); *G06F 16/3344* (2019.01); *G06F 16/951* (2019.01);
(Continued)

(58) Field of Classification Search
CPC . G06F 8/425; G06F 8/436; G06F 8/42; G06F 17/2785; G06F 17/30731;
(Continued)

(56) References Cited

U.S. PATENT DOCUMENTS 9,715,496 B1 * 7/2017 Sapoznik .............. G06F 17/279
2015/0161995 A1 * 6/2015 Sainath ................... G10L 15/16
704/232
(Continued)

FOREIGN PATENT DOCUMENTS

CN 106407381 A 2/2017
CN 106610972 A * 5/2017 ............. G06F 17/30
WO WO-2017092380 A1 * 6/2017 ............. G06N 3/006

*Primary Examiner* — Leshui Zhang
(74) *Attorney, Agent, or Firm* — Seed IP Law Group LLP (57) ABSTRACT

The present disclosure discloses a method and apparatus for generating a parallel text in the same language. The method comprises: acquiring a source segmented word sequence and a pre-trained word vector table; determining a source word vector sequence corresponding to the source segmented word sequence, according to the word vector table; importing the source word vector sequence into a first pre-trained recurrent neural network model, to generate an intermediate vector of a preset dimension for characterizing semantics of the source segmented word sequence; importing the intermediate vector into a second pre-trained recurrent neural network model, to generate a target word vector sequence corresponding to the intermediate vector; and determining a target segmented word sequence corresponding to the target word vector sequence according to the word vector table, and determining the target segmented word sequence as a parallel text in the same language corresponding to the source segmented word sequence.

15 Claims, 6 Drawing Sheets

(51) Int. Cl.
*G06N 3/08* (2006.01)
*G06F 16/951* (2019.01)
*G06N 3/04* (2006.01)
*G06F 16/33* (2019.01)

(52) U.S. Cl.
CPC ........ *G06F 17/277* (2013.01); *G06F 17/2715* (2013.01); *G06F 17/2881* (2013.01); *G06N 3/0445* (2013.01); *G06N 3/0454* (2013.01); *G06N 3/08* (2013.01)

(58) Field of Classification Search
CPC ................ G06F 17/271; G06F 17/277; G06F 17/30666; G06F 9/44589; G06F 11/1476; G06F 11/2263; G06F 2207/4824; G06F 17/16; G06F 17/3061; G06F 17/30625; G06F 17/30628; G06F 17/30634; G06F 17/30637; G06F 17/30646; G06F 17/30654; G06F 17/30657; G06F 17/3066; G06F 17/30663; G06F 17/30684; G06F 17/30672; G06F 17/3069; G06F 17/30693; G06F 17/30702; G06F 17/30705; G06F 17/30707; G06F 17/3071; G06F 17/28; G06F 17/2809–2845; G06F 17/2854; G06F 17/2863; G06F 17/2872; G06F 17/2881; G06F 17/30; G06F 17/30008; G06F 17/30864; G06F 17/3087; G06F 17/30917; G06F 17/3092; G06F 17/30932; G06F 17/30943; G06F 17/30949; G06F 17/30952; G06F 17/30955; G06F 17/30958; G06F 17/30961; G06F 17/30964; G06F 17/30967; G06F 17/3097; G06F 17/30976; G06F 17/30979; G06F 17/30982; G06F 17/30985; G06F 17/30988; G06F 17/30991; G10L 25/30; G10L 15/16; G06N 3/08; G06N 3/088; G06N 3/02; G06N 3/0418; G06N 3/0427; G06N 3/0454
USPC ........ 704/1, 4, 5, 7, 10, 201, 202, 203, 204, 704/219, 222, 231, 232, 237, 239, 238, 704/251, 252, 256, 257, 266, 269, 270, 704/270.1, 9, 243–245, E17.005–E17.009, 704/E17.013–E17.015
See application file for complete search history.

(56) References Cited

U.S. PATENT DOCUMENTS

| | | | |
|---|---|---|---|
| 2016/0163310 A1* | 6/2016 | Lee | G10L 15/16 704/232 |
| 2016/0217129 A1* | 7/2016 | Lu | G06F 17/2785 |
| 2018/0276525 A1* | 9/2018 | Jiang | G06N 3/006 |

* cited by examiner

METHOD AND APPARATUS FOR GENERATING PARALLEL TEXT IN SAME LANGUAGE

CROSS-REFERENCE TO RELATED APPLICATION

This application is related to and claims priority from Chinese Application No. 201710464118.3, filed on Jun. 19, 2017 and entitled "Method and Apparatus for Generating Parallel Text in Same Language", the entire disclosure of which is hereby incorporated by reference.

TECHNICAL FIELD

The present disclosure relates to the field of computer technology, specifically to the field of Internet Technology, and more specifically to a method and apparatus for generating a parallel text in same language.

BACKGROUND

Artificial intelligence (AI) is a new technological science for studying and developing theories, methods, techniques, and application systems that simulate, extend, and expand human intelligence. As a branch of computer science, the AI seeks to understand the essence of intelligence and produces a new type of intelligent machine that responds in a similar manner to human intelligence. Study in this field comprises robotics, speech recognition, image recognition, natural language processing, and expert systems, etc. The natural language processing in the field of AI is an important direction in the field of computer science and AI. It researches various theories and methods which can realize an effective communication between a person and a computer in a natural language. Generating a parallel text in same language and having similar semantics is an important constituent of the natural language processing. There are many application occasions for the parallel text in the same language. As an example, at present, when a search engine is searching a query sentence inputted by a user, since the user is unconstraint when inputting the query sentence, the effect tends to be inferior if the search is performed by using the query sentence inputted by the user. To be able to achieve a better search result, a parallel text in the same language is usually generated for the query sentence, and then the search is performed by using the generated parallel text in the same language.

However, at present, an approach to generate a parallel text in the same language of a text is generally to generate a substitution dictionary based on a parallel corpus, by using a statistical alignment algorithm or a rule alignment algorithm. Then, a parallel text in the same language after being replaced is generated according to an a priori knowledge and a substitution dictionary. In the existing approach of generating the parallel text in the same language, the alignment algorithm is complicated and requires much manual intervention, resulting in the generated substitution dictionary having a low accuracy rate. The substitution dictionary also needs to be stored. Generally, the size of the storage space required by the substitution dictionary is thousands of megabytes. Therefore, there exists a problem that the required storage space is excessive.

SUMMARY

The present disclosure provides a method and apparatus for generating a parallel text in same language to solve the technical problems mentioned in the foregoing Background section.

In a first aspect, embodiments of the present disclosure provide a method for generating a parallel text in same language, comprising: acquiring a source segmented word sequence and a pre-trained word vector table, wherein the word vector table characterizes a correlation between a word and a word vector; determining a source word vector sequence corresponding to the source segmented word sequence, according to the word vector table; importing the source word vector sequence into a first pre-trained recurrent neural network model, to generate an intermediate vector of a preset dimension for characterizing semantics of the source segmented word sequence, wherein the first recurrent neural network model characterizes a correlation between a word vector sequence and a vector of the preset dimension; importing the intermediate vector into a second pre-trained recurrent neural network model, to generate a target word vector sequence corresponding to the intermediate vector, wherein the second recurrent neural network model characterizes a correlation between the vector of the preset dimension and the word vector sequence; and determining a target segmented word sequence corresponding to the target word vector sequence according to the word vector table, and determining the target segmented word sequence as a parallel text in the same language corresponding to the source segmented word sequence.

In some embodiments, before the acquiring a source segmented word sequence and a pre-trained word vector table, the method further comprises: receiving a query request sent by a user using a terminal, the query request comprising a query sentence; preprocessing the query sentence to obtain a segmented word sequence of the query sentence, the preprocessing comprising a word segmentation process and removing of a special symbol; and determining the obtained segmented word sequence as the source segmented word sequence.

In some embodiments, after the determining the target segmented word sequence as a parallel text in the same language corresponding to the source segmented word sequence, the method further comprises: searching according to the parallel text in the same language, to obtain a search result; and sending the search result to the terminal.

In some embodiments, before the acquiring a source segmented word sequence and a pre-trained word vector table, the method further comprises a training step. The training step comprises: acquiring at least one pair of parallel segmented word sequences in the same language, wherein each pair of parallel segmented word sequences in the same language comprises a first segmented word sequence and a second segmented word sequence having the same language and same semantics; acquiring a preset word vector table, a first preset recurrent neural network model and a second preset recurrent neural network model; for each pair of parallel segmented word sequences in the same language in the at least one pair of parallel segmented word sequences in the same language, determining a first segmented word vector sequence corresponding to the first segmented word sequence of the pair of parallel segmented word sequences in the same language according to the preset word vector table, importing the first segmented word vector sequence into the first preset recurrent neural network model to obtain the vector of the preset dimension corresponding to the first segmented word vector sequence, importing the obtained vector into the second preset recurrent neural network model to obtain a second segmented word vector sequence corresponding to the obtained vector, determining a word sequence corresponding to the second segmented word vector sequence according to the preset word vector table, and adjusting the preset word vector table, the first preset recurrent neural network model, and the second preset recurrent neural network model according to difference information between the obtained word sequence and the second segmented word sequence of the pair of parallel segmented word sequences in the same language; and defining the preset word vector table, the first preset recurrent neural network model and the second preset recurrent neural network model respectively as the word vector table, the first recurrent neural network model and the second recurrent neural network model obtained by training.

In some embodiments, the first recurrent neural network model and the second recurrent neural network model are time recurrent neural network models.

In some embodiments, the determining a source word vector sequence corresponding to the source segmented word sequence according to the word vector table, comprises: for each segmented word in the source segmented word sequence, querying, in the word vector table, a word vector matching the segmented word, and determining the found word vector as a source word vector corresponding to a position, in the source word vector sequence, identical to a position of the segmented word in the source segmented word sequence.

In some embodiments, the determining a target segmented word sequence corresponding to the target word vector sequence according to the word vector table, comprises: for each target word vector in the target word vector sequence, selecting, from the word vector table, a word corresponding to a word vector having a highest similarity with the target word vector, and determining the selected word as a target segmented word corresponding to a position, in the target segmented word sequence, identical to a position of the target word vector in the target word vector sequence.

In a second aspect, the embodiments of the present disclosure provide an apparatus for generating a parallel text in same language, comprising: an acquiring unit, configured to acquire a source segmented word sequence and a pre-trained word vector table, wherein, the word vector table characterizes a correlation between a word and a word vector; a first determining unit, configured to determine a source word vector sequence corresponding to the source segmented word sequence according to the word vector table; a first generating unit, configured to import the source word vector sequence into a first pre-trained recurrent neural network model, to generate an intermediate vector of a preset dimension for characterizing semantics of the source segmented word sequence, wherein the first recurrent neural network model characterizes a correlation between a word vector sequence and a vector of the preset dimension; a second generating unit, configured to import the intermediate vector into a second pre-trained recurrent neural network model, to generate a target word vector sequence corresponding to the intermediate vector, wherein the second recurrent neural network model characterizes a correlation between the vector of the preset dimension and the word vector sequence; and a second determining unit, configured to determine a target segmented word sequence corresponding to the target word vector sequence according to the word vector table, and determine the target segmented word sequence as a parallel text in the same language corresponding to the source segmented word sequence.

In some embodiments, the apparatus further comprises: a receiving unit, configured to receive a query request sent by a user using a terminal, the query request comprising a query sentence; a preprocessing unit, configured to preprocess the query sentence to obtain a segmented word sequence of the query sentence, the preprocessing comprising a word segmentation process and removing of a special symbol; and a third determining unit, configured to determine the obtained segmented word sequence as the source segmented word sequence.

In some embodiments, the apparatus further comprises: a searching unit, configured to search according to the parallel text in the same language to obtain a search result; and a sending unit, configured to send the search result to the terminal.

In some embodiments, the apparatus further comprises a training unit. The training unit comprises: a first acquiring module, configured to acquire at least one pair of parallel segmented word sequences in the same language, wherein each pair of parallel segmented word sequences in the same language comprises a first segmented word sequence and a second segmented word sequence having the same language and same semantics; a second acquiring module, configured to acquire a preset word vector table, a first preset recurrent neural network model and a second preset recurrent neural network model; an adjusting module, configured to, for each pair of parallel segmented word sequences in the same language in the at least one pair of parallel segmented word sequences in the same language, determine a first segmented word vector sequence corresponding to the first segmented word sequence of the pair of parallel segmented word sequences in the same language according to the preset word vector table, import the first segmented word vector sequence into the first preset recurrent neural network model to obtain the vector of the preset dimension corresponding to the first segmented word vector sequence, import the obtained vector into the second preset recurrent neural network model to obtain a second segmented word vector sequence corresponding to the obtained vector, determine a word sequence corresponding to the second segmented word vector sequence according to the preset word vector table, and adjust the preset word vector table, the first preset recurrent neural network model and the second preset recurrent neural network model according to difference information between the obtained word sequence and the second segmented word sequence of the pair of parallel segmented word sequences in the same language; and a defining module, configured to define the preset word vector table, the first preset recurrent neural network model and the second preset recurrent neural network model respectively as the word vector table, the first recurrent neural network model and the second recurrent neural network model obtained by training.

In some embodiments, the first recurrent neural network model and the second recurrent neural network model are time recurrent neural network models.

In some embodiments, the first determining unit is further configured to, for each segmented word in the source segmented word sequence, query, in the word vector table, a word vector matching the segmented word, and determine the found word vector as a source word vector corresponding to a position, in the source word vector sequence, identical to a position of the segmented word in the source segmented word sequence.

In some embodiments, the second determining unit is further configured to, for each target word vector in the target word vector sequence, select, from the word vector table, a word corresponding to a word vector having a highest similarity with the target word vector, and determine the selected word as a target segmented word corresponding to a position, in the target segmented word sequence, identical to a position of the target word vector in the target word vector sequence.

In a third aspect, the embodiments of the present disclosure provide an electronic device, comprising: one or more processors; and a storage unit, configured to store one or more programs; wherein the one or more programs, when executed by the one or more processors, cause the one or more processors to implement the method described in any implementation in the first aspect.

In a fourth aspect, the embodiments of the present disclosure provide a computer readable storage medium storing a computer program, wherein the computer program, when executed by a processor, implements the method described in any implementation in the first aspect.

The method and apparatus for generating a parallel text in same language provided by the embodiments of the present disclosure, by determining a corresponding source word vector sequence according to a word vector table, importing the source word vector sequence into a first pre-trained recurrent neural network model, to generate an intermediate vector of a preset dimension for characterizing semantics of a source segmented word sequence, next importing the intermediate vector into a second pre-trained recurrent neural network model to generate a target word vector sequence corresponding to the intermediate vector, then determining a target segmented word sequence corresponding to the target word vector sequence according to the word vector table, and finally determine the target segmented word sequence as a parallel text in the same language corresponding to the source segmented word sequence. Accordingly, the generation process does not require manual intervention, reducing an algorithmic complexity of generating the parallel text in the same language. In addition, it does not require to store a substitution dictionary occupying an excessive space (the typical size is thousands of megabytes). In the generation process, it only requires to store the word vector table, the parameters of the first recurrent neural network model and the parameters of the second recurrent neural network model (the total space occupied by the three is about tens of megabytes), thereby reducing the required storage space.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
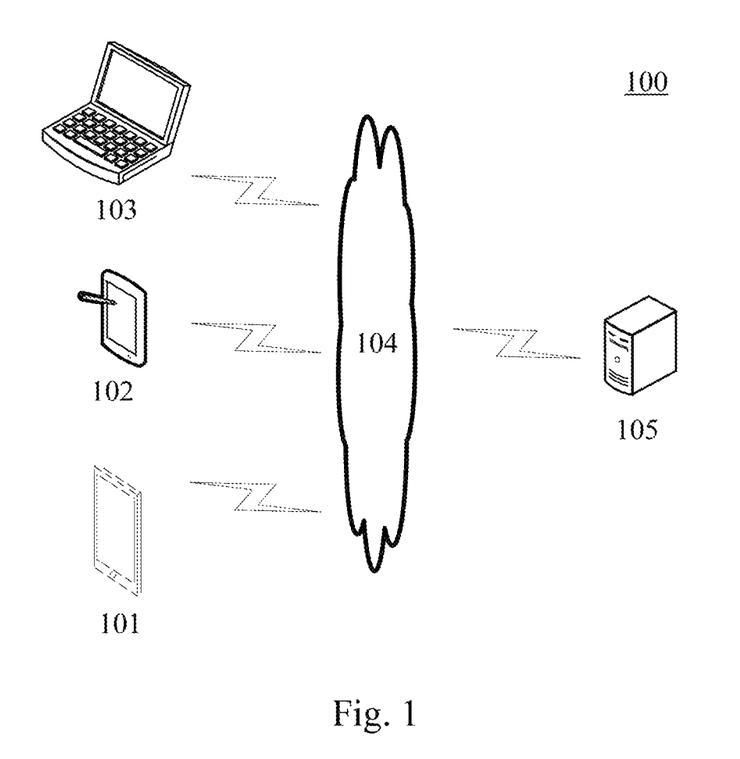
FIG. 1 is an exemplary system architecture diagram in which the present disclosure may be applied.

FIG. 1 shows an exemplary architecture of a system 100 which may be used by a method and apparatus for generating a parallel text in same language according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as cloud storage applications, shopping applications, search applications, instant messaging tools, mailbox clients, and social platform software may be installed on the terminal devices 101, 102 and 103.

The terminal devices 101, 102 and 103 may be various electronic devices having a display screen, including but not limited to, smart phones, tablet computers, laptop computers and desktop computers.

The server 105 may be a server providing various services, for example, a background search server providing support from search websites displayed on the terminal devices 101, 102 and 103. The background search server may perform a process such as analysis on data like a received search request, and feed the process result (for example, webpage linked data) back to the terminal devices.

It should be noted that the method for generating a parallel text in same language provided in embodiments of the present disclosure is generally performed by the server 105. Correspondingly, an apparatus for generating a parallel text in same language is generally installed in the server 105. In some situations, the method for generating a parallel text in the same language provided in embodiments of the present disclosure may also be separately performed by the server 105 without the terminal devices 101, 102 and 103. At this time, the server 105 may be a server having server functions, and may also be a general electronic device having operation functions without server functions.

It should be appreciated that the numbers of the terminal devices, the networks and the servers in FIG. 1 are merely illustrative. Any number of terminal devices, networks and servers may be provided based on implementation requirements.

Figure 2:
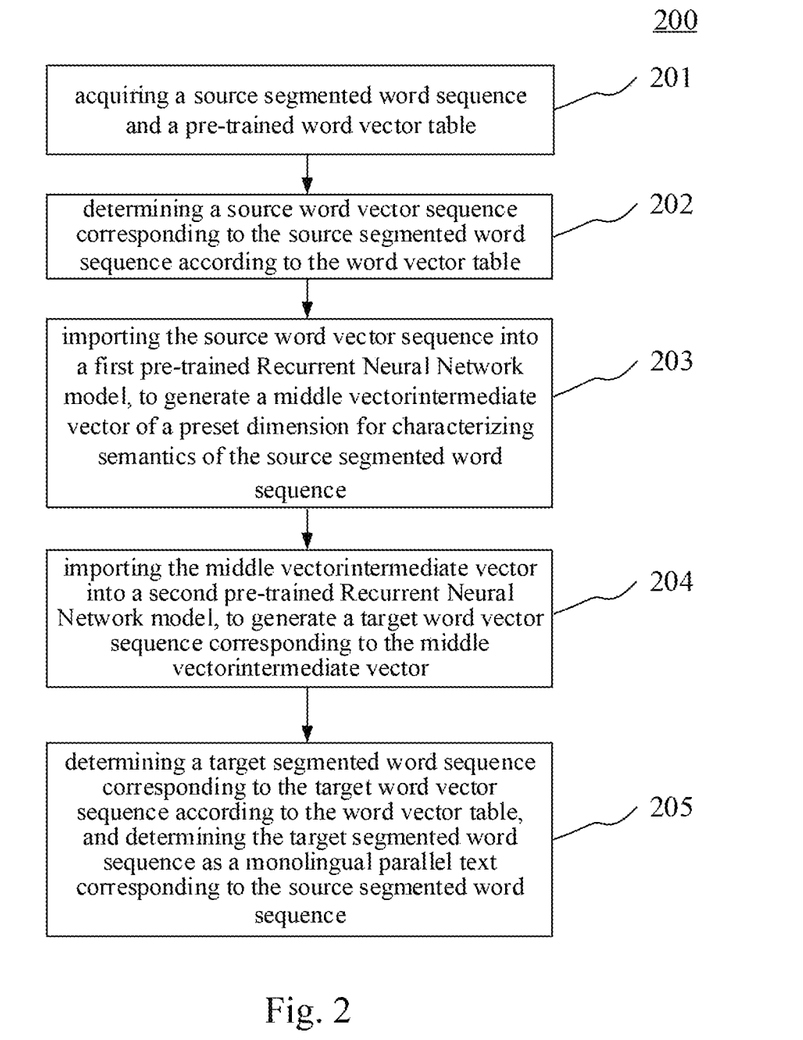
FIG. 2 is a flowchart of an embodiment of a method for generating a parallel text in same language according to the present disclosure.

Further referring to FIG. 2, which illustrates a flow 200 of an embodiment of a method for generating a parallel text in same language according to the present disclosure. The method for generating a parallel text in the same language includes the following steps.

In step 201, acquiring a source segmented word sequence and a pre-trained word vector table.

In this embodiment, an electronic device (for example, the server as illustrated in FIG. 1) on which the method for generating a parallel text in the same language is performed may locally and remotely acquire the source segmented word sequence and the pre-trained word vector table from other electronic devices network connected with the electronic device.

In this embodiment, a segmented word indicates a word or phrase without a special symbol or a punctuation mark. A segmented word sequence is a sequence consisting of at least one segmented word arranged in order. The source segmented word sequence may be a segmented word sequence of a to-be-generated parallel text in the same language pre-stored locally in the electronic device. The source segmented word sequence may also be a segmented word sequence of a to-be-generated parallel text in the same language appointed by a user. The source segmented word sequence may also be a segmented word sequence of a to-be-generated parallel text in the same language received by the electronic device from other electronic devices (e.g., the terminal devices illustrated in FIG. 1) network connected with the electronic device. A parallel text of a text indicates a text having semantics similar to that of this text. A parallel text in same language of a text indicates a text being in the same language and having semantics similar to this text. For instance, "book a direct train" is a parallel text in the same language of "direct train ticket booking", and "the rice has proteins or not" is a parallel text in the same language of "the cooked rice has proteins or not".

In this embodiment, the word vector table maps words or phrases to a real number vector, and the mapped real number vector is a word vector. By using the word vector table, it can be implemented that a characteristic in a natural language is reduced from a high dimensional space of a size of a vocabulary table to a relatively low dimensional space. A principle of measuring the word vector table is: the similarity between the word vectors of two words having similar semantics is higher, and, the similarity between the word vectors of two words not having similar semantics is lower. As an example, the word vector may be a real number vector represented by Distributed Representation (or Distributional Representation). The word vector table here may be pre-trained. For instance, one record in the word vector table may be that the word is "Beijing", and the corresponding word vector is "−0.1654, 0.8764, 0.5364, −0.6354, 0.1645". The word vector here has 5 dimensions. However, in a practical application, the word vector may have any dimensions, which is not specifically limited by the present disclosure.

It should be noted that, how to train the word vector table is a widely researched and applied existing technology, which will not be described here.

As an example, a sentence library including a large number of sentences and the words included in each sentence may be first acquired; and then, for each word in a word library, the sentences including this word in the sentence library is acquired, and then, in these sentences, a contextual word adjacent to this word is acquired. The word vector of each word is calculated based on a principle that the sum of degrees of relevancy between the word and the contextual words is maximum.

As an example, it is also possible that a preset type of each to-be-analyzed word included in the sentence library, in each sentence to which each word belongs in the sentence library, is acquired to obtain a type set corresponding to each to-be-analyzed word. The word vector of each to-be-analyzed word is set to a training variable, and a calculation model of a sum of degrees of relevancy between each of the to-be-analyzed words is built as a training model, according to the type set and word vector corresponding to each to-be-analyzed word. According to the training model, the training variable is trained to obtain the word vector of each to-be-analyzed word, based on a principle of maximizing the sum of the degrees of relevancy.

In step 202, determining a source word vector sequence corresponding to the source segmented word sequence according to the word vector table.

In this embodiment, according to the word vector table obtained in step 201, the electronic device (for example, the server as illustrated in FIG. 1) may determine the source word vector sequence corresponding to the source segmented word sequence. Here, the source word vector sequence is a word vector sequence for generating a parallel text in the same language of the source segmented word sequence. The source word vector sequence consists of at least one source word vector arranged in order. Every source word vector in the source word vector sequence corresponds to every source segmented word in the source segmented word sequence, respectively, and every source word vector in the source word vector sequence is obtained by querying in the word vector table, according to the source segmented word corresponding to this source word vector, in the source segmented word sequence.

In some alternative implementations of this embodiment, step 202 may include: for each segmented word in the source segmented word sequence, querying, in the word vector table, a word vector matching the segmented word, and determining the queried word vector as the source word vector corresponding to the position, in the source word vector sequence, identical to the position of the segmented word in the source segmented word sequence.

In step 203, importing the source word vector sequence into a first pre-trained recurrent neural network model, to generate an intermediate vector of a preset dimension for characterizing semantics of the source segmented word sequence.

In this embodiment, the electronic device on which the method for generating a parallel text in the same language is performed may import the source word vector sequence into the first pre-trained recurrent neural network model, to generate the intermediate vector characterizing the preset dimension of the semantics of the source segmented word sequence. The first recurrent neural network model characterizes a correlation between a word vector sequence and a vector of the preset dimension.

In practice, a recurrent neural network (RNNs) model is different from traditional FNNs (Feed-forward Neural Networks). The RNNs introduce a directional circulation, and can process those contextual problems between inputs. In a traditional neural network model, it is from an input layer to a hidden layer, then to an output layer, there is a full connection between layers, and the nodes between each layer are not connected. However, this general neural network is incapable of processing problems related to the sequence. In the recurrent neural network model, a current output of a sequence is also associated with a previous output. The specific expression form is that the recurrent neural network will memorize previous information and apply it into the calculation of the current output. That is, the nodes in the hidden layer are not unconnected, they are connected, and the input of the hidden layer not only includes an output of the input layer, but also includes the last output of the hidden layer. Theoretically, the recurrent neural network can process any length of sequential data.

However, in practice, in order to reduce complexity, it is frequently assumed that the current state is merely associated with several previous states.

As an example, the first recurrent neural network model may be obtained by: using a large number of word vector sequences and corresponding vectors of preset dimensions as training data, calculating the inputted word vector sequence by using any nonlinear activation function (e.g., Sigmoid function, Softplus function, and Bipolar Sigmoid function, etc.) as a neuron activation function of a first preset recurrent neural network model, and using the vector of the preset dimension corresponding to the inputted word vector sequence as an output to train the initial first recurrent neural network model.

In step 204, importing the intermediate vector into a second pre-trained recurrent neural network model, to generate a target word vector sequence corresponding to the intermediate vector.

In this embodiment, the electronic device may import the intermediate vector generated in step 203 into the second pre-trained second recurrent neural network model, to generate the target word vector sequence corresponding to the intermediate vector. The second recurrent neural network model characterizes a correlation between the vector of the preset dimension and the word vector sequence. Here, the target word vector sequence consists of at least one target word vector arranged in order, and the number of target word vectors in the target word vector sequence may be the same as the number of source word vectors in the source word vector sequence, and may also be different from the number of source word vectors in the source word vector sequence. That is, the number of target word vectors in the target word vector sequence is not fixed.

As an example, the second recurrent neural network model may be obtained by: using a large number of vectors of preset dimension and corresponding word vector sequences as training data, calculating the inputted vector of the preset dimension by using any nonlinear activation function (e.g., Sigmoid function, Softplus function, and Bipolar Sigmoid function, etc.) as a neuron activation function of a second preset recurrent neural network model, and using the word vector sequence corresponding to the inputted vector of the preset dimension as an output to train the initial second recurrent neural network model.

In step 205, determining a target segmented word sequence corresponding to the target word vector sequence according to the word vector table, and determining the target segmented word sequence as a parallel text in the same language corresponding to the source segmented word sequence.

In this embodiment, the electronic device may determine the target segmented word sequence corresponding to the target word vector sequence generated in step 204 according to the word vector table acquired in step 201, and determine the target segmented word sequence as the parallel text in the same language corresponding to the source segmented word sequence. Here, the target segmented word sequence consists of at least one target segmented word arranged in order. Each target segmented word in the target segmented word sequence corresponds to each target word vector in the target word vector sequence, respectively. Each target segmented word in the target segmented word sequence is obtained by querying in the word vector table, according to the target word vector corresponding to this target segmented word, in the target word vector sequence.

In some alternative implementations of this embodiment, step 205 may be performed as follows.

For each target word vector in the target word vector sequence, a word corresponding to a word vector having a highest similarity with the target word vector is selected from the word vector table, and the selected word is determined as a target segmented word corresponding to a position, in the target segmented word sequence, identical to a position of the target word vector in the target word vector sequence.

As an example, a cosine similarity between two word vectors may be calculated as the similarity between the two word vectors.

As an example, a Euclidean distance between two word vectors may also be calculated, the closer the Euclidean distance is, the higher the similarity between the two word vectors is, and the further the Euclidean distance is, the lower the similarity between the two word vectors is.

Since the word vector table acquired in step 201 may map the source segmented word to the source word vector, when the target word vector is mapped to the target segmented word in step 205, the word vector table acquired in step 201 (i.e., the same word vector table as that used when the source segmented word is mapped to the source word segmentation vector) is still used. Thus, according to the word vector table acquired in step 201, the target word vector sequence is mapped to the target segmented word sequence, and the obtained target segmented word sequence has the same language and similar semantics to the source segmented word sequence. That is, the obtained target segmented word sequence is the parallel text in the same language corresponding to the source segmented word sequence.

In some alternative implementations of this embodiment, the word vector table, the first recurrent neural network model and the second recurrent neural network model may be obtained by training with the following training steps.

First, acquiring at least one pair of parallel segmented word sequences in the same language.

Here, each pair of parallel segmented word sequences in the same language comprises a first segmented word sequence and a second segmented word sequence having the same language and same semantics. As an example, each acquired pair of parallel segmented word sequences in the same language may be the first segmented word sequence and second segmented word sequence having the same language and the same semantics and manually annotated by those skilled.

Next, acquiring the preset word vector table, the first preset recurrent neural network model and the second preset recurrent neural network model.

Then, for each pair of parallel segmented word sequences in the same language in the at least one pair of parallel segmented word sequences in the same language, a first segmented word vector sequence corresponding to the first segmented word sequence of the pair of parallel segmented word sequences in the same language is determined according to the preset word vector table; the first segmented word vector sequence is imported into the first preset recurrent neural network model to obtain the vector of the preset dimension corresponding to the first segmented word vector sequence; the obtained vector is imported into the second preset recurrent neural network model to obtain a second segmented word vector sequence corresponding to the obtained vector; a word sequence corresponding to the second segmented word vector sequence is determined according to the preset word vector table; and the preset word vector table, the first preset recurrent neural network model and the second preset recurrent neural network model are adjusted according to difference information between the obtained word sequence and the second segmented word sequence of the pair of parallel segmented word sequences in the same language. As an example, the adjustment to the word vector table may be to adjust a value of each dimension in a word vector, of which a word corresponding to a word, in the word vector table, the adjustment to the first recurrent neural network model may be to adjust the input matrix, hidden layer matrix and output matrix of the first recurrent neural network model, and the adjustment to the second recurrent neural network model may be to adjust the input matrix, hidden layer matrix and output matrix of the second recurrent neural network model.

Finally, defining the preset word vector table, the first preset recurrent neural network model and the second preset recurrent neural network model respectively as the word vector table, the first recurrent neural network model and the second recurrent neural network model obtained by training. Here, each parameter in the preset word vector table, the first preset recurrent neural network model and the second preset recurrent neural network model has been adjusted and optimized in the training process, which can achieve a better effect in use.

In some alternative implementations of this embodiment, both of the first recurrent neural network model and the second recurrent neural network model may be time recurrent neural network models, for example, a LSTM (Long Short-Term Memory) time recurrent neural network model.

Figure 3:
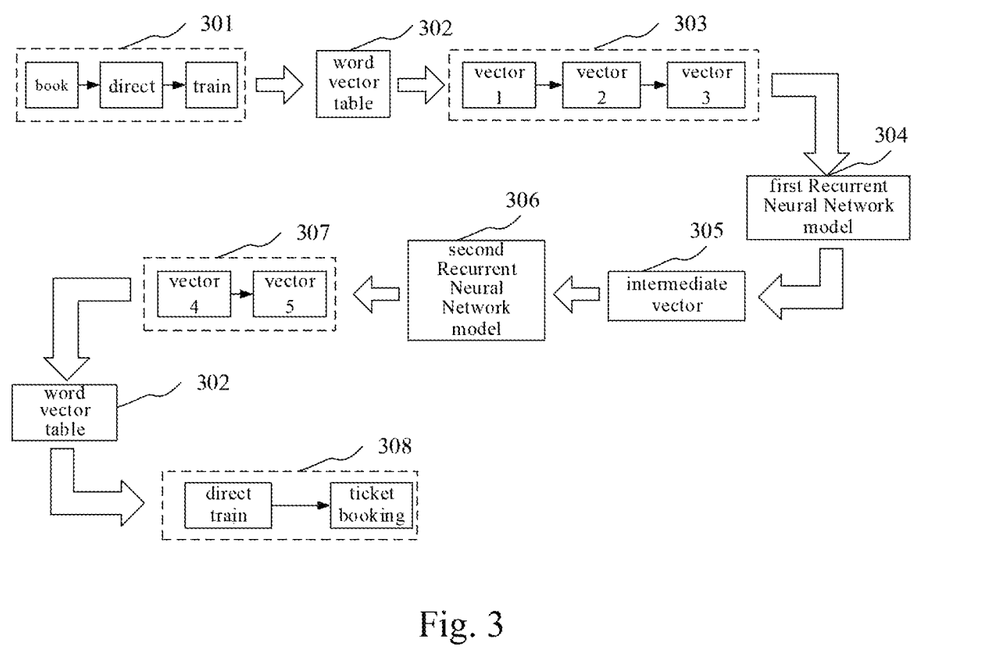
FIG. 3 is a schematic diagram of an application scenario of the method for generating a parallel text in the same language according to the present disclosure.

Further referring to FIG. 3, which is a schematic diagram of an application scenario of the method for generating a parallel text in the same language according to the present disclosure. In the application scenario of FIG. 3, first, the electronic device acquires a source segmented word sequence 301 "book a direct train" and a word vector table 302. Next, a source word vector sequence 303 of the source segmented word sequence 301 is determined through the word vector table 302. Then, the source word vector sequence 303 is imported into a first pre-trained recurrent neural network model 304, to generate an intermediate vector 305. Then, the intermediate vector 305 is imported into a second pre-trained recurrent neural network model 306 to generate a target word vector sequence 307. Finally, a target segmented word sequence 308 "direct train ticket booking" corresponding to the target word vector sequence 307 is determined through the word vector table 302, thereby generating a parallel text in the same language "direct train ticket booking" corresponding to the source segmented word sequence 301 "book a direct train".

In the method provided by the above embodiments of the present disclosure, a corresponding source word vector sequence is determined according to a word vector table, the source word vector sequence is imported into a first pre-trained recurrent neural network model to generate an intermediate vector of a preset dimension for characterizing semantics of a source segmented word sequence, next the intermediate vector is imported into a second pre-trained recurrent neural network model to generate a target word vector sequence corresponding to the intermediate vector, then a target segmented word sequence corresponding to the target word vector sequence is determined according to the word vector table, and finally the target segmented word sequence is determined as a parallel text in the same language corresponding to the source segmented word sequence. Accordingly, the algorithmic complexity of generating the parallel text in the same language is reduced, and the required storage space is reduced.

Figure 4:
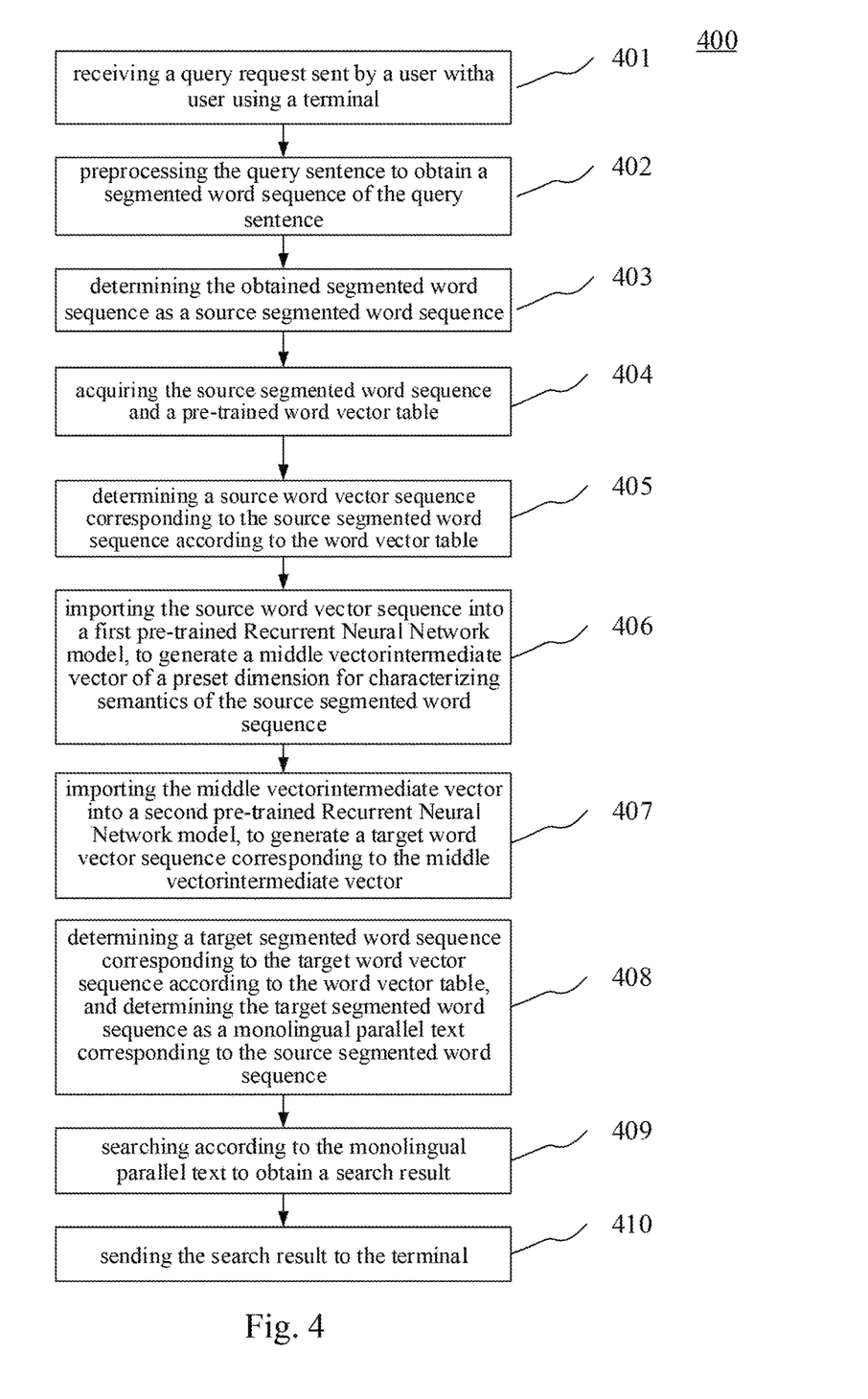
FIG. 4 is a flowchart of another embodiment of the method for generating a parallel text in the same language according to the present disclosure.

Further referring to FIG. 4, which illustrates a flow 400 of another embodiment of the method for generating a parallel text in the same language. The flow 400 of this method for generating a parallel text in the same language includes the following steps.

In step 401, receiving a query request sent by a user using a terminal.

In this embodiment, an electronic device (for example, the server as illustrated in FIG. 1) on which the method for generating a parallel text in the same language is performed may receive the query request sent by the user using the terminal by means of wired connection or wireless connection. Here, the query request may include a query sentence. As an example, the user may use a browser installed on the terminal to access a search website, input the query sentence, and then send the query request including the query sentence to the electronic device providing support to the search website. Thus, the electronic device can receive the query request.

In step 402, preprocessing the query sentence to obtain a segmented word sequence of the query sentence.

In this embodiment, the electronic device may preprocess the query sentence to obtain the segmented word sequence of the query sentence. Here, the preprocessing may include a word segmentation process and removing of a special symbol.

The word segmentation process is a process of recombining continuous character sequences into the word sequence according to certain rules. It should be noted that the word segmentation process is an existing technology widely studied and applied by those skilled in the art, which will not be described here. As an example, the word segmentation process may adopt a string matching based word segmentation method, an understanding based word segmentation method, and a statistics based word segmentation method.

Here, the special symbol indicates a symbol which has a low usage frequency and is difficult to be directly inputted, compared to a traditional or frequently-used symbol, for example, a mathematical symbol, a unit symbol, a tab stop, etc. The removing of the special symbol indicates a process of removing a to-be-removed special symbol comprised in a text having the special symbol, and retaining non-special symbols comprised therein.

Upon the preprocessing, the segmented word sequence of the query sentence can be obtained. Here, the segmented word sequence consists of at least one segmented word arranged in order.

In step 403, determining the obtained segmented word sequence as a source segmented word sequence.

In this embodiment, the electronic device may determine the segmented word sequence obtained in step 402 as the source segmented word sequence for the use in the following steps.

In step 404, acquiring the source segmented word sequence and a pre-trained word vector table.

In step 405, determining a source word vector sequence corresponding to the source segmented word sequence, according to the word vector table.

In step 406, importing the source word vector sequence into a first pre-trained recurrent neural network model, to generate an intermediate vector of a preset dimension for characterizing semantics of the source segmented word sequence.

In step 407, importing the intermediate vector into a second pre-trained recurrent neural network model, to generate a target word vector sequence corresponding to the intermediate vector.

In step 408, determining a target segmented word sequence corresponding to the target word vector sequence according to the word vector table, and determining the target segmented word sequence as a parallel text in the same language corresponding to the source segmented word sequence.

In this embodiment, the specific operations of step 404, step 405, step 406, step 407 and step 408 are substantially the same as the specific operations of step 201, step 202, step 203, step 204 and step 205 in the embodiment illustrated in FIG. 2, which will not be repeatedly described here.

In step 409, performing a search according to the parallel text in the same language to obtain a search result.

In this embodiment, after determining the parallel text in the same language corresponding to the source segmented word sequence in step 408, the electronic device may perform a search according to the parallel text in the same language to obtain the search result. As an example, the search result may include a website link related to a website of the parallel text in the same language. Since the user is unconstraint when inputting the query sentence on the terminal, if the search is performed according to content inputted by the user, a recall rate will be low. By using the operations from step 404 to step 408, after a parallel text in the same language corresponding to the segmented word sequence of the query sentence is generated, the generated parallel text in the same language have similar semantics to the query sentence, but is more suitable for the searching. Thus, the recall rate of the searching can be improved.

In step 410, sending the search result to the terminal.

In this embodiment, the electronic device may send the search result obtained by the searching in step 409 to the terminal receiving the query request in step 401.

As shown in FIG. 4, different from the embodiment corresponding to FIG. 2, the flow 400 of the method for generating a parallel text in the same language in this embodiment further includes steps of receiving the query request from the terminal, pre-processing the query sentence in the query request, searching according to the determined parallel text in the same language, and sending the search result to the terminal. Accordingly, the solution described in this embodiment can improve the recall rate of the search of a search engine.

Figure 5:
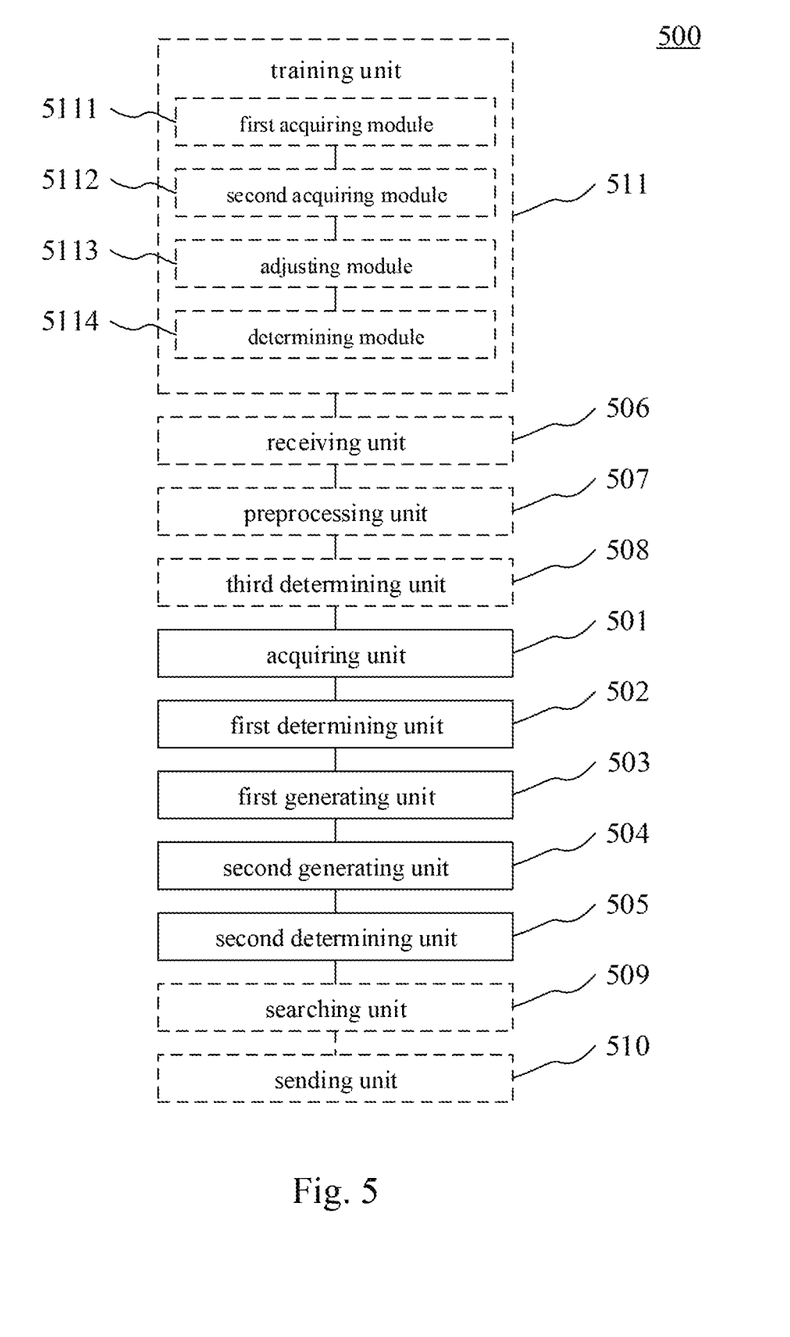
FIG. 5 is a schematic structural diagram of an embodiment of an apparatus for generating a parallel text in the same language according to the present disclosure.

Further referring to FIG. 5, as an implementation of the method shown in each of the above-mentioned figures, the present disclosure provides an embodiment of an apparatus for generating a parallel text in the same language. The embodiment of the apparatus corresponds to the embodiment of the method as illustrated in FIG. 2, and the apparatus may be applied in various electronic devices.

As shown in FIG. 5, an apparatus 500 for generating a parallel text in the same language described in this embodiment includes: an acquiring unit 501, a first determining unit 502, a first generating unit 503, a second generating unit 504 and a second determining unit 505. The acquiring unit 501 is configured to acquire a source segmented word sequence and a pre-trained word vector table, wherein, the word vector table characterizes a correlation between a word and a word vector; the first determining unit 502 is configured to determine a source word vector sequence corresponding to the source segmented word sequence according to the word vector table; the first generating unit 503 is configured to import the source word vector sequence into a first pre-trained recurrent neural network model, to generate an intermediate vector of a preset dimension for characterizing semantics of the source segmented word sequence, wherein the first recurrent neural network model characterizes a correlation between the word vector sequence and a vector of the preset dimension; the second generating unit 504 is configured to import the intermediate vector into a second pre-trained recurrent neural network model, to generate a target word vector sequence corresponding to the intermediate vector, wherein the second recurrent neural network model characterizes a correlation between the vector of the preset dimension and the word vector sequence; and the second determining unit 505 is configured to determine a target segmented word sequence corresponding to the target word vector sequence according to the word vector table, and determine the target segmented word sequence as a parallel text in the same language corresponding to the source segmented word sequence.

In this embodiment, for specific processes of the first determining unit 502, the first generating unit 503, the second generating unit 504 and the second determining unit 505 of the apparatus for generating a parallel text in the same language 500, and their technical effects, reference may be made to relative descriptions of step 201, step 202, step 203, step 204 and step 205 in the corresponding embodiment of FIG. 2 respectively, which will not be repeatedly described here.

In some alternative implementations of this embodiment, the apparatus for generating a parallel text in the same language 500 may further include: a receiving unit 506, configured to receive a query request sent by a user using a terminal, the query request including a query sentence; a preprocessing unit 507, configured to preprocess the query sentence to obtain a segmented word sequence of the query sentence, the preprocessing including a word segmentation process and removing of a special symbol; and a third determining unit 508, configured to determine the obtained segmented word sequence as the source segmented word sequence. For specific processes of the receiving unit 506, the preprocessing unit 507 and the third determining unit 508 and their technical effects, reference may be made to relative descriptions of step 401, step 402 and step 403 in the corresponding embodiment of FIG. 4 respectively, which will not be repeatedly described here.

In some alternative implementations of this embodiment, the apparatus for generating a parallel text in the same language 500 may further include: a searching unit 509, configured to search according to the parallel text in the same language to obtain a search result; and a sending unit 510, configured to send the search result to the terminal. For specific processes of the searching unit 509 and the sending unit 510 and their technical effects, reference may be made to relative descriptions of step 409 and step 410 in the corresponding embodiment of FIG. 4 respectively, which will not be repeatedly described here.

In some alternative implementations of this embodiment, the apparatus for generating a parallel text in the same language 500 may further include a training unit 511. The training unit 511 may include: a first acquiring module 5111, configured to acquire at least one pair of parallel segmented word sequences in the same language, wherein each pair of parallel segmented word sequences in the same language includes a first segmented word sequence and a second segmented word sequence having the same language and same semantics; a second acquiring module 5112, configured to acquire a preset word vector table, a first preset recurrent neural network model and a second preset recurrent neural network model; an adjusting module 5113, configured to, for each pair of parallel segmented word sequences in the same language in the at least one pair of parallel segmented word sequences in the same language, determine a first segmented word vector sequence corresponding to the first segmented word sequence of the pair of parallel segmented word sequences in the same language according to the preset word vector table, import the first segmented word vector sequence into the first preset recurrent neural network model to obtain the vector of the preset dimension corresponding to the first segmented word vector sequence, import the obtained vector into the second preset recurrent neural network model to obtain a second segmented word vector sequence corresponding to the obtained vector, determine a word sequence corresponding to the second segmented word vector sequence according to the preset word vector table, and adjust the preset word vector table, the first preset recurrent neural network model and the second preset recurrent neural network model according to difference information between the obtained word sequence and the second segmented word sequence of the pair of parallel segmented word sequences in the same language; and a defining module 5114, configured to define the preset word vector table, the first preset recurrent neural network model and the second preset recurrent neural network model respectively as the word vector table, the first recurrent neural network model and the second recurrent neural network model obtained by training. For specific processes of the training unit 511 and its technical effect, reference may be made to relative descriptions in the corresponding embodiment of FIG. 2 respectively, which will not be repeatedly described here.

In some alternative implementations of this embodiment, both of the first recurrent neural network model and the second recurrent neural network model may be time recurrent neural network models.

In some alternative implementations of this embodiment, the first determining unit 502 may be further configured to, for each segmented word in the source segmented word sequence, query, in the word vector table, a word vector matching the segmented word, and determine the found word vector as a source word vector corresponding to a position, in the source word vector sequence, identical to a position of the segmented word in the source segmented word sequence. For specific processes of the first determining unit 502 and its technical effect, reference may be respectively made to relative descriptions of step 202 in the corresponding embodiment of FIG. 2, which will not be repeatedly described here.

In some alternative implementations of this embodiment, the second determining unit 505 may be further configured to, for each target word vector in the target word vector sequence, select, from the word vector table, a word corresponding to a word vector having a highest similarity with the target word vector, and determine the selected word as a target segmented word corresponding to a position, in the target segmented word sequence, identical to a position of the target word vector in the target word vector sequence. For specific processes of the second determining unit 505 and its technical effect, reference may be respectively made to relative descriptions of step 205 in the corresponding embodiment of FIG. 2, which will not be repeatedly described here.

Figure 6:
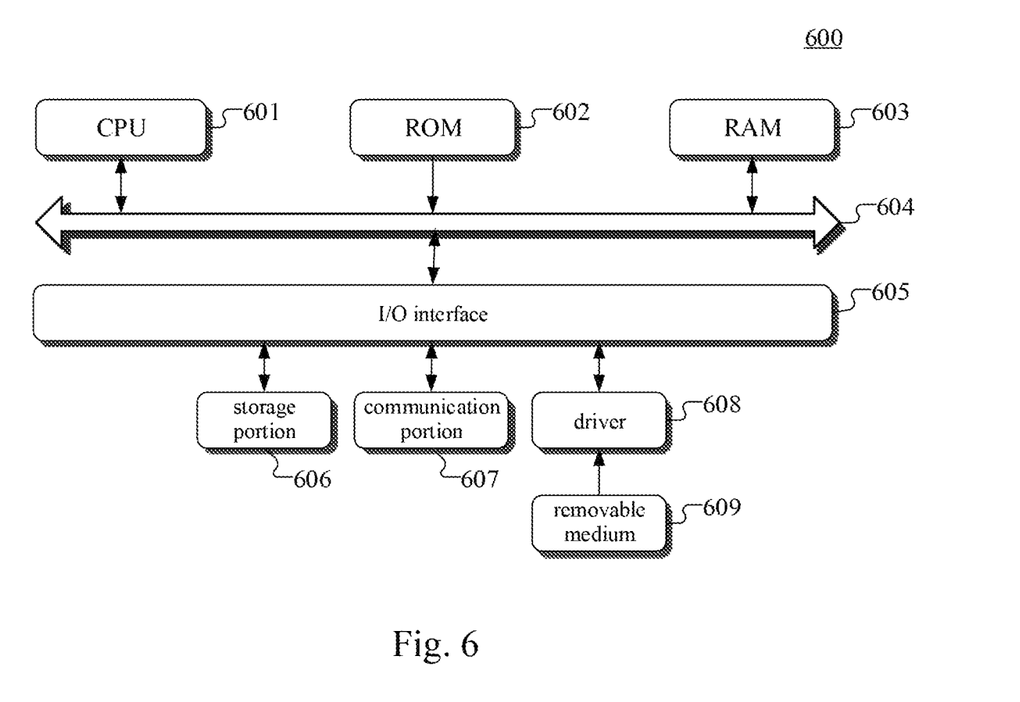
FIG. 6 is a schematic structural diagram of a computer system adapted to implement an electronic device according to embodiments of the present disclosure.

Referring to FIG. 6, which illustrates a schematic structural diagram of a computer system 600 adapted to implement an electronic device according to embodiments of the present disclosure. The electronic device illustrated in FIG. 6 is merely an example, which shall not bring any limitations to functions and application ranges of the embodiments according to the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquiring unit, a first determining unit, a first generating unit, a second generating unit and a second determining unit, where the names of these units or modules do not in some cases constitute a limitation to such units or modules themselves. For example, the first determining unit may also be described as "a unit for determining a source word vector sequence".

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: acquire a source segmented word sequence and a pre-trained word vector table, wherein the word vector table characterizes a correlation between a word and a word vector; determine a source word vector sequence corresponding to the source segmented word sequence, according to the word vector table; import the source word vector sequence into a first pre-trained recurrent neural network model, to generate an intermediate vector of a preset dimension for characterizing semantics of the source segmented word sequence, wherein the first recurrent neural network model characterizes a correlation between a word vector sequence and a vector of the preset dimension; import the intermediate vector into a second pre-trained recurrent neural network model, to generate a target word vector sequence corresponding to the intermediate vector, wherein the second recurrent neural network model characterizes a correlation between the vector of the preset dimension and the word vector sequence; and determine a target segmented word sequence corresponding to the target word vector sequence according to the word vector table, and determining the target segmented word sequence as a parallel text in the same language corresponding to the source segmented word sequence.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for generating a parallel text in same language, comprising:
    acquiring a source segmented word sequence and a pre-trained word vector table, wherein the pre-trained word vector table characterizes a correlation between a word and a word vector, and a similarity between word vectors of two words having similar semantics is higher than a similarity between word vectors of two words not having similar semantics, the word vector is a real number vector represented by Distributed Representation or Distributional Representation;
    determining a source word vector sequence corresponding to the source segmented word sequence, according to the pre-trained word vector table;
    importing the source word vector sequence into a first pre-trained recurrent neural network model, to generate an intermediate vector of a preset dimension for characterizing semantics of the source segmented word sequence, wherein the first recurrent neural network model characterizes a correlation between a word vector sequence and a vector of the preset dimension;
    importing the intermediate vector into a second pre-trained recurrent neural network model, to generate a target word vector sequence corresponding to the intermediate vector, wherein the second recurrent neural network model characterizes a correlation between the vector of the preset dimension and the word vector sequence; and
    determining a target segmented word sequence corresponding to the target word vector sequence according to the pre-trained word vector table, and determining the target segmented word sequence as a parallel text in the same language corresponding to the source segmented word sequence, the target segmented word sequence being in the same language and having semantics similar to the source segmented word sequence.

2. The method according to claim 1, wherein before the acquiring a source segmented word sequence and a pre-trained word vector table, the method further comprises:
    receiving a query request sent by a user using a terminal, the query request comprising a query sentence;
    preprocessing the query sentence to obtain a segmented word sequence of the query sentence, the preprocessing comprising a word segmentation process and removing of a special symbol; and determining the obtained segmented word sequence as the source segmented word sequence.

3. The method according to claim 2, wherein after the determining the target segmented word sequence as a parallel text in the same language corresponding to the source segmented word sequence, the method further comprises:
    searching according to the parallel text in the same language, to obtain a search result; and
    sending the search result to the terminal.

4. The method according to claim 1, wherein before the acquiring a source segmented word sequence and a pre-trained word vector table, the method further comprises a training step, the training step comprising:
    acquiring at least one pair of parallel segmented word sequences in the same language, wherein each pair of parallel segmented word sequences in the same language comprises a first segmented word sequence and a second segmented word sequence having the same language and same semantics;
    acquiring a preset word vector table, a first preset recurrent neural network model and a second preset recurrent neural network model;
    for each pair of parallel segmented word sequences in the same language in the at least one pair of parallel segmented word sequences in the same language, determining a first segmented word vector sequence corresponding to the first segmented word sequence of the pair of parallel segmented word sequences in the same language according to the preset word vector table, importing the first segmented word vector sequence into the first preset recurrent neural network model to obtain the vector of the preset dimension corresponding to the first segmented word vector sequence, importing the obtained vector into the second preset recurrent neural network model to obtain a second segmented word vector sequence corresponding to the obtained vector, determining a word sequence corresponding to the second segmented word vector sequence according to the preset word vector table, and adjusting the preset word vector table, the first preset recurrent neural network model, and the second preset recurrent neural network model according to difference information between the obtained word sequence and the second segmented word sequence of the pair of parallel segmented word sequences in the same language; and
    defining the preset word vector table, the first preset recurrent neural network model and the second preset recurrent neural network model respectively as the pre-trained word vector table, the first recurrent neural network model and the second recurrent neural network model obtained by training.

5. The method according to claim 4, wherein the first recurrent neural network model and the second Recurrent neural network model are time recurrent neural network models.

6. The method according to claim 5, wherein the determining a source word vector sequence corresponding to the source segmented word sequence according to the pre-trained word vector table comprises:
    for each segmented word in the source segmented word sequence, querying, in the pre-trained word vector table, a word vector matching the segmented word, and determining the found word vector as a source word vector corresponding to a position, in the source word vector sequence, identical to a position of the segmented word in the source segmented word sequence.

7. The method according to claim 6, wherein the determining a target segmented word sequence corresponding to the target word vector sequence according to the pre-trained word vector table comprises:
    for each target word vector in the target word vector sequence, selecting, from the pre-trained word vector table, a word corresponding to a word vector having a highest similarity with the target word vector, and determining the selected word as a target segmented word corresponding to a position, in the target segmented word sequence, identical to a position of the target word vector in the target word vector sequence.

8. An apparatus for generating a parallel text in same language, comprising:
    at least one processor; and
    a memory storing instructions, which when executed by the at least one processor, cause the at least one processor to perform operations, the operations comprising:
    acquiring a source segmented word sequence and a pre-trained word vector table, wherein the pre-trained word vector table characterizes a correlation between a word and a word vector, and a similarity between word vectors of two words having similar semantics is higher than a similarity between word vectors of two words not having similar semantics, the word vector is a real number vector represented by Distributed Representation or Distributional Representation;
    determining a source word vector sequence corresponding to the source segmented word sequence according to the pre-trained word vector table;
    importing the source word vector sequence into a first pre-trained recurrent neural network model, to generate an intermediate vector of a preset dimension for characterizing semantics of the source segmented word sequence, wherein the first recurrent neural network model characterizes a correlation between a word vector sequence and a vector of the preset dimension;
    importing the intermediate vector into a second pre-trained recurrent neural network model, to generate a target word vector sequence corresponding to the intermediate vector, wherein the second recurrent neural network model characterizes a correlation between the vector of the preset dimension and the word vector sequence; and
    determining a target segmented word sequence corresponding to the target word vector sequence according to the pre-trained word vector table, and determining the target segmented word sequence as a parallel text in the same language corresponding to the source segmented word sequence, the target segmented word sequence being in the same language and having semantics similar to the source segmented word sequence.

9. The apparatus according to claim 8, wherein before the acquiring a source segmented word sequence and a pre-trained word vector table, the operations further comprise:
    receiving a query request sent by a user using a terminal, the query request comprising a query sentence;
    preprocessing the query sentence to obtain a segmented word sequence of the query sentence, the preprocessing comprising a word segmentation process and removing of a special symbol; and
    determining the obtained segmented word sequence as the source segmented word sequence.

10. The apparatus according to claim 9, wherein after the determining the target segmented word sequence as a parallel text in the same language corresponding to the source segmented word sequence, the operations further comprise:

searching according to the parallel text in the same language to obtain a search result; and     sending the search result to the terminal.

11. The apparatus according to claim 8, wherein before the acquiring a source segmented word sequence and a pre-trained word vector table, the operations further comprise a training step comprising:

acquiring at least one pair of parallel segmented word sequences in the same language, wherein each pair of parallel segmented word sequences in the same language comprises a first segmented word sequence and a second segmented word sequence having the same language and same semantics;

acquiring a preset word vector table, a first preset recurrent neural network model and a second preset recurrent neural network model;

for each pair of parallel segmented word sequences in the same language in the at least one pair of parallel segmented word sequences in the same language, determining a first segmented word vector sequence corresponding to the first segmented word sequence of the pair of parallel segmented word sequences in the same language according to the preset word vector table, importing the first segmented word vector sequence into the first preset recurrent neural network model to obtain the vector of the preset dimension corresponding to the first segmented word vector sequence, importing the obtained vector into the second preset recurrent neural network model to obtain a second segmented word vector sequence corresponding to the obtained vector, determining a word sequence corresponding to the second segmented word vector sequence according to the preset word vector table, and adjusting the preset word vector table, the first preset recurrent neural network model and the second preset recurrent neural network model according to difference information between the obtained word sequence and the second segmented word sequence of the pair of parallel segmented word sequences in the same language; and     defining the preset word vector table, the first preset recurrent neural network model and the second preset recurrent neural network model respectively as the pre-trained word vector table, the first recurrent neural network model and the second recurrent neural network model obtained by training.

12. The apparatus according to claim 11, wherein the first recurrent neural network model and the second recurrent neural network model are time recurrent neural network models.

13. The apparatus according to claim 12, wherein the determining a source word vector sequence corresponding to the source segmented word sequence according to the pre-trained word vector table comprises:

for each segmented word in the source segmented word sequence, querying, in the pre-trained word vector table, a word vector matching the segmented word, and determining the found word vector as a source word vector corresponding to a position, in the source word vector sequence, identical to a position of the segmented word in the source segmented word sequence.

14. The apparatus according to claim 13, wherein the determining a target segmented word sequence corresponding to the target word vector sequence according to the pre-trained word vector table comprises:

for each target word vector in the target word vector sequence, selecting, from the pre-trained word vector table, a word corresponding to a word vector having a highest similarity with the target word vector, and determining the selected word as a target segmented word corresponding to a position, in the target segmented word sequence, identical to a position of the target word vector in the target word vector sequence.

15. A non-transitory computer readable storage medium storing a computer program, wherein the program, when executed by a processor, implements a method comprising:

acquiring a source segmented word sequence and a pre-trained word vector table, wherein the pre-trained word vector table characterizes a correlation between a word and a word vector, and a similarity between word vectors of two words having similar semantics is higher than a similarity between word vectors of two words not having similar semantics, the word vector is a real number vector represented by Distributed Representation or Distributional Representation;

determining a source word vector sequence corresponding to the source segmented word sequence, according to the pre-trained word vector table;

importing the source word vector sequence into a first pre-trained recurrent neural network model, to generate an intermediate vector of a preset dimension for characterizing semantics of the source segmented word sequence, wherein the first recurrent neural network model characterizes a correlation between a word vector sequence and a vector of the preset dimension;

importing the intermediate vector into a second pre-trained recurrent neural network model, to generate a target word vector sequence corresponding to the intermediate vector, wherein the second recurrent neural network model characterizes a correlation between the vector of the preset dimension and the word vector sequence; and     determining a target segmented word sequence corresponding to the target word vector sequence according to the pre-trained word vector table, and determining the target segmented word sequence as a parallel text in the same language corresponding to the source segmented word sequence, the target segmented word sequence being in the same language and having semantics similar to the source segmented word sequence.

\* \* \* \* \*